United States Patent [19]
Van Bennekom

[11] Patent Number: 6,099,673
[45] Date of Patent: Aug. 8, 2000

[54] METHOD OF COATING FUSER MEMBERS

[75] Inventor: Hans Lochmann Van Bennekom, Dansville, N.Y.

[73] Assignee: Xerox Corporation, Stamford, Conn.

[21] Appl. No.: 09/069,476

[22] Filed: Apr. 29, 1998

[51] Int. Cl.[7] .......................... B32B 31/20; B65H 81/00; B21K 1/02; B29C 31/04
[52] U.S. Cl. ................ 156/187; 156/309.6; 264/320; 29/895.211; 29/895.32
[58] Field of Search ............... 156/86, 187, 201, 156/212, 213, 215, 308.2, 309.6, 218; 399/320, 321, 330, 331, 333; 492/49, 56; 493/250; 29/895, 895.211, 895.32; 264/319, 320, 331.14

[56] References Cited

U.S. PATENT DOCUMENTS

| | | | |
|---|---|---|---|
| 2,179,742 | 11/1939 | Heres | 493/250 X |
| 2,257,823 | 10/1941 | Stokes | 493/250 X |
| 3,470,046 | 9/1969 | Verdin | 156/86 |
| 3,481,805 | 12/1969 | Holmes et al. | 156/86 |
| 3,749,621 | 7/1973 | Shoffner | 156/86 |
| 4,043,098 | 8/1977 | Putnam, Jr. et al. | 493/250 X |
| 4,198,739 | 4/1980 | Budinger et al. | 492/56 |
| 5,123,151 | 6/1992 | Uhehara et al. | 29/130 |
| 5,468,531 | 11/1995 | Kikukawa et al. | 428/36.5 |
| 5,716,700 | 2/1998 | Kikukawa et al. | 428/339 |

FOREIGN PATENT DOCUMENTS

WO 96/10778   4/1995   WIPO .

*Primary Examiner*—Jeff H. Aftergut
*Assistant Examiner*—John T Haran

[57] ABSTRACT

A method of coating a fuser member with a polymeric sheet is disclosed. Initially, the fuser member is placed in a substantially perpendicular position with respect to the polymeric sheet. The polymeric sheet is then wrapped around the fuser member such that the sheet first comes into contact with an end of the fuser member and is wrapped along the length of the fuser member from one end to the other to form a continuous layer over the fuser member. Last, the wrapped polymeric sheet is sintered to the fuser member to form a seamless coated polymer layer.

1 Claim, 4 Drawing Sheets

FIG. 3
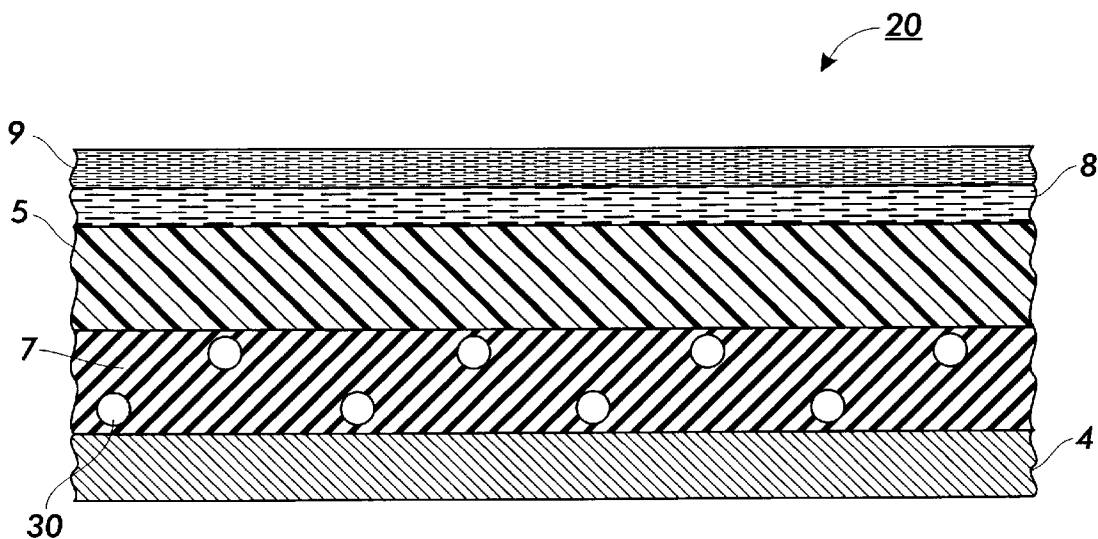
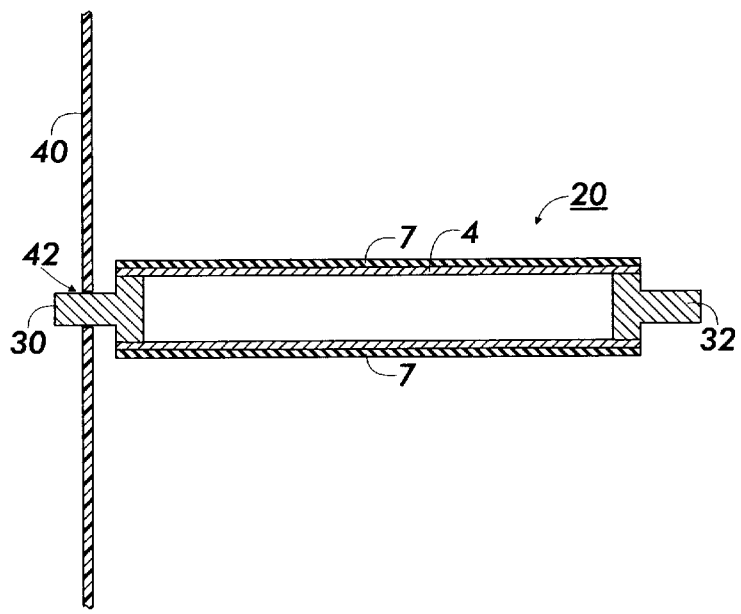
FIG. 4

METHOD OF COATING FUSER MEMBERS

The present invention relates to a method of coating fuser members and more particularly is directed to applying a sheet of polymeric material over the fuser member and sintering the sheet to the fuser member to provide a uniform coating on the fuser member.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes it to be firmly bonded to the support.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members.

Known fuser members include those with outer layers of polytetrafluoroethylene to which a release agent such as silicone oil has been applied. The Teflon-type outer layer has a thickness of about several mils. Silicone rubber and fluoroelastomers such as VITON® (Trademark from E.I. DuPont) coated heat members have been used to enhance copy quality. The following are known fuser members with polymeric coatings.

WO 96/10778 discloses a release coating for use on printer rollers and belts. The coating is a thin expanded polytetrafluorethelene skin that has a porous surface attached to a substratum with an adhesive layer and an impermeable surface exposed as the contact surface. The use of dual surfaces on a single thin coating provides for a bond to the substratum materials, such as the silicone elastomer layer, as well as being wear and chemical resistant.

U.S. Pat. No. 5,123,151 teaches an elastic fixing roll with an elastic body layer not less than 200 µm thick formed on a metal core with a covering layer with a release property formed in a thickness ranging from 3 µm to 200 µm on the surface of the elastic body, the covering layer being formed of a composite material composed of fibrillated PTFE and elastomer having releasing properties. When the covering layer is applied in sheet form it is wound or wrapped around the fixing roll, however the wrapping technique of the present invention is not disclosed.

U.S. Pat. No. 5,468,531 discloses an elastic fixing roll having an elastic compliant body material and release surface material. The body material is made of porous rubber or foam. The release surface material is formed of porous PTFE film containing silicone rubber or fluorosilicone rubber. The release surface material is bonded to the body material by a non-continuous layer of adhesive. U.S. Pat. No. 5,716,700 is drawn to an elastic fixing roll similar to that of U.S. Pat. No. 5,468,531, however the release surface material is adhered to the outer surface of the elastic porous body material by bonding of portions of the rubber of the release material to contacting portions of the rubber of the porous body material.

"Fuser Member with Silicone Rubber and Aluminum Oxide Layer" Ser. No. 09/069,307 filed Apr. 29, 1998 with the same inventor, Hans Lochman Van Bennekom, and is assigned to the same assignee as the present invention. This patent application teaches a fuser member having a substrate and thereover an intermediate filled elastomeric layer comprising silicone rubber and aluminum oxide in the amount of from about 0.05 to about 5 percent, preferably 1 to about 2.5 percent, based on the total volume of intermediate layer. The intermediate layer has an outer polymeric layer with an optional outer fluid surfactant layer and thereover an optional fluid relase layer.

In color fusing, normally customer preference for color prints is a high gloss or matte opaque finish. This usually requires the use of smooth, conformable heat member operating at a high temperature and having a long-dwell nip. In addition, extra release agent is necessary for improving toner release due to the increase in toner used for color developing. For developing color images, several layers of different color toner are deposited on the latent image resulting in extra thickness (higher toner pile height) of unfused toner on a color image. Therefore, a higher operating temperature for color fusers is necessary. Further, extended dwell time at the nip is necessary to ensure complete toner flow. In addition, a conformable fusing member is necessary in order to ensure sufficient release and stripping. Moreover, a smooth surface is necessary in order to provide color images with preferred increased gloss.

However, known fusing members do not provide the quality for colored images as they do for black and white images. Therefore, it is desired to provide a heat member, preferably in combination with a pressure member, wherein high quality color prints or copies are produced. Particularly, it is desired to provide fusing members demonstrating excellent results at the higher temperatures necessary in color fusing. In addition, it is desired to provide fusing members which require little or no fusing oil on the outer surface, while still providing excellent release. Further, it is desired to provide fusing members which provide complete toner flow, and increased gloss. Moreover, it is desired to reduce or eliminate pinhole defects in the polymeric layer of the fuser member.

SUMMARY OF THE INVENTION

The present invention is directed to a novel way of coating a fuser member with a polymeric sheet. Preferably, a sheet of polymeric material is expanded in a first and second direction, resulting in elongated pores in one direction. A fuser member having a substrate coated with an intermediate layer thereon is then located substantially perpendicuarly to the sheet material. The pores of the expanded sheet material are oriented such that the elongated direction of the pores substantially coincide with the axis of the fuser member when the sheet material is applied to the fuser member. A first end of the fuser member is then pressed against the polymeric sheet and the sheet is wrapped around the fuser member from the first end to the second end resulting in a smoothly wrapped fuser member. The wrapped polymeric sheet is then sintered to the fuser member in such a manner to result in a substantially wrinkle free, well adhered coating.

BRIEF DESCRIPTION OF THE DRAWINGS

For a better understanding of the present invention, reference may be had to the accompanying figures.

FIG. 3 shows a cross-sectional view of an embodiment of the present invention.

FIG. 4 shows the orientation of a sheet of polymeric material with respect to a fuser member prior to wrapping;

DETAILED DESCRIPTION OF THE PRESENT INVENTION

Figure 1:
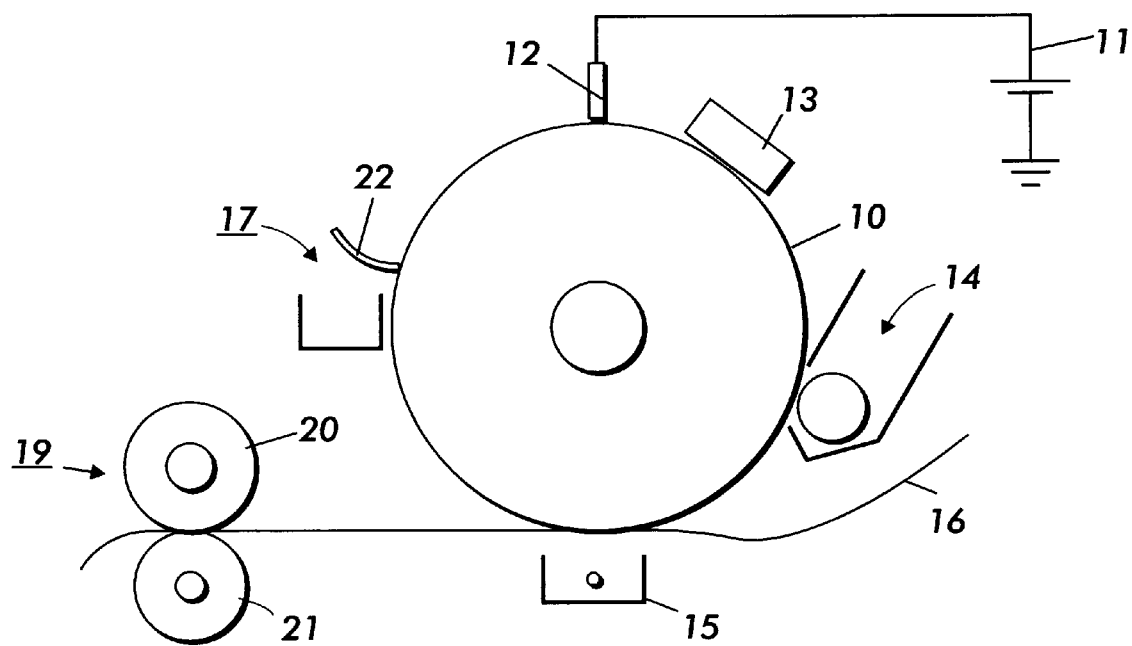
FIG. 1 generally shows an electrostatographic machine.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith.

Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer.

Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
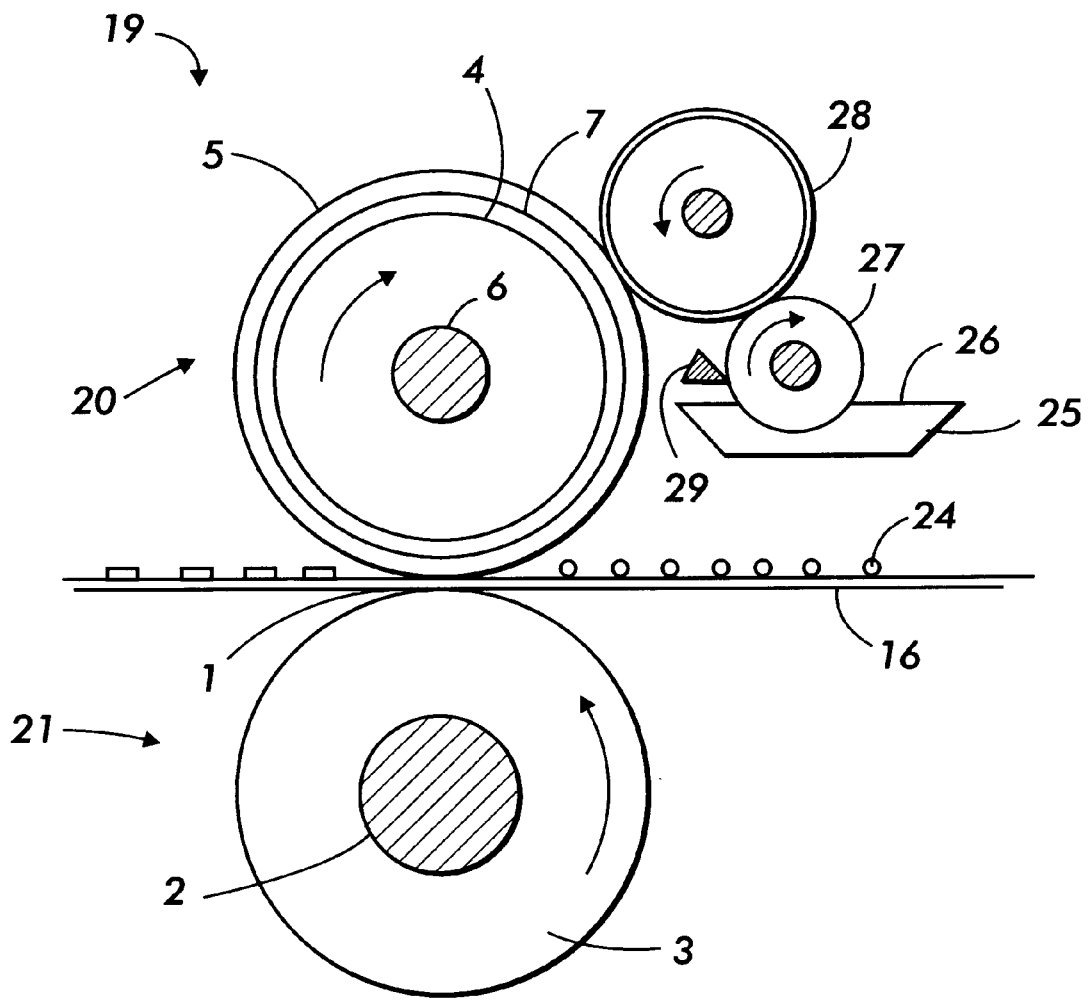
FIG. 2 shows a fusing system in accordance with an embodiment of the present invention.

Referring to FIG. 2, an embodiment of a fusing station 19 is depicted with an embodiment of a fuser roll 20 comprising polymer surface 5 upon a suitable base member 4, a hollow cylinder or core fabricated from any suitable metal, such as aluminum, anodized aluminum, steel, nickel, copper, and the like, having a suitable heating element 6 disposed in the hollow portion thereof which is coextensive with the cylinder. The fuser member 20 can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact elastomer surface 5 of fuser roll 20. As shown in FIG. 2, an embodiment of a backup roll or pressure roll 21 is depicted as having a rigid steel core 2 with a polymer or elastomer surface or layer 3 thereon. Sump 25 contains polymeric release agent 26 which may be a solid or liquid at room temperature, but it is a fluid at operating temperatures. The pressure member 21 may include a heating element (not shown).

In the embodiment shown in FIG. 2 for applying the polymeric release agent 26 to polymer or elastomer surface 5, two release agent delivery rolls 27 and 28 rotatably mounted in the direction indicated are provided to transport release agent 26 to polymer or elastomer surface 5. Delivery roll 27 is partly immersed in the sump 25 and transports on its surface release agent from the sump to the delivery roll 28. By using a metering blade 29, a layer of polymeric release fluid can be applied initially to delivery roll 27 and subsequently to polymer or elastomer 5 in controlled thickness ranging from submicrometer thickness to thicknesses of several micrometers of release fluid. Thus, by metering device 29, preferably from about 0.1 to about 2 micrometers or greater thicknesses of release fluid can be applied to the surface of polymer or elastomer 5.

FIG. 3 depicts a cross-sectional view of a preferred embodiment of the invention, wherein fuser member 20 comprises substrate 4, intermediate surface layer 7 comprising silicone rubber, and aluminum oxide fillers 30 dispersed therein, and outer polymeric surface layer 5. FIG. 3 also depicts optional surfactant layer 8 and optional fluid release agent layer 9.

Fuser member as used herein refers to fuser members including fusing rolls, belts, films, sheets and the like; donor members, including donor rolls, belts, films, sheets and the like; and pressure members, including pressure rolls, belts, films, sheets and the like; and other members useful in the fusing system of an electrostatographic or xerographic, including digital, machine. The fuser member of the present invention may be employed in a wide variety of machines and is not specifically limited in its application to the particular embodiment depicted herein.

Any suitable substrate may be selected for the fuser member. The fuser member substrate may be a roll, belt, flat surface, sheet, film, or other suitable shape used in the fixing of thermoplastic toner images to a suitable copy substrate. It may take the form of a fuser member, a pressure member or a release agent donor member, preferably in the form of a cylindrical roll. Typically, the fuser member is made of a hollow cylindrical metal core, such as copper, aluminum, stainless steel, or certain plastic materials chosen to maintain rigidity, structural integrity, as well as being capable of having a polymeric material coated thereon and adhered firmly thereto. It is preferred that the supporting substrate is a cylindrical metal roller. In one embodiment, the core, which may be an aluminum or steel cylinder, is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes.

The intermediate layer preferably comprises a silicone rubber of a thickness so as to form a conformable layer. Suitable silicone rubbers include room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the silanes, siloxanes (preferably polydimethylsiloxanes) such as, fluorosilicones, dimethylsilicones, liquid silicone rubbers such as vinyl crosslinked heat curable rubbers or silanol room temperature crosslinked materials, and the like.

Silicone rubber materials tend to swell during the fusing process, especially in the presence of a release agent and high temperatures. In the case of fusing color toner, a relatively larger amount of release agent is necessary to enhance release due to the need for a larger amount of color toner than required for black and white copies and prints. Therefore, the silicone rubber is more susceptible to swell in an apparatus using color toner. In order to decrease the swell, D/97634 discloses that aluminum oxide added in a relatively small amount reduces the swell.

Therefore, dispersed or contained in the intermediate silicone rubber layer is aluminum oxide in a relatively low amount of from about 0.05 to about 5 percent, preferably from about 0.1 to about 4 percent, and particularly preferred from about 1 to about 2.5 percent by total volume of the intermediate layer. Without the aluminum oxide in the silicone layer, the silicone layer tends to swell. Further, without the aluminum oxide in the layer, there is insufficient heat transmissibility from the heating source to the outer layer. In addition to the aluminum oxide, other metal oxides and/or metal hydroxides may be used. Such metal oxides and/or metal hydroxides include tin oxide, zinc oxide, calcium hydroxide, magnesium oxide, lead oxide, chromium oxide, copper oxide, and the like, and mixtures thereof. In a preferred embodiment, a metal oxide is present in an amount of from about 10 to about 50 percent, preferably from about 20 to about 40 percent, and particularly preferred about 35 percent by total volume of the intermediate layer. In a preferred embodiment copper oxide is used in these amounts in addition to the aluminum oxide. In a particularly preferred embodiment, copper oxide is present in an amount of about 35 percent and aluminum oxide is present in an amount of about 2.5 percent by total volume of the intermediate layer.

In general, the intermediate filled silicone layer has a thickness of from about 0.5 to about 10 mm, preferably from about 0.1 to about 5 mm, and preferably from about 1 to about 3 mm. More specifically, if the intermediate filled silicone layer is present on a pressure member, it has a thickness of from about 0.05 to about 5 mm, preferably from about 0.1 to about 3 mm, and particularly preferred about 1 mm. When present on a fuser member, the intermediate filled silicone layer has a thickness of from about 1 to about 10 mm, preferably from about 2 to about 5 mm, and particularly preferred about 3 mm. It is preferred that the thickness of the intermediate layer of the fuser member be higher than that of the pressure member so that, the fuser member is more deformable than the pressure member.

Examples of suitable outer fusing layers of the fuser member herein include polymers such as fluoropolymers. Particularly useful fluoropolymer coatings for the present invention include TEFLON®-like materials such as polytetrafluoroethylene (PTFE), fluorinated ethylenepropylene copolymer (FEP), perfluorovinylalkylether tetrafluoroethylene copolymer (PFA TEFLON®), polyethersulfone, copolymers and terpolymers thereof, and the like. Also preferred are fluoroelastomers such as those described in detail in U.S. Pat. Nos. 5,166,031; 5,281,506; 5,366,772; 5,370,931; 4,257,699; 5,017,432; 5,061,965; 4,891,407; 5,066,683; and 5,157,058, the disclosures each of which are incorporated by reference herein in their entirety. These fluoroelastomers, particularly from the class of copolymers, terpolymers, and tetrapolymers of vinylidenefluoride, hexafluoropropylene and tetrafluoroethylene and a possible cure site monomer, are known commercially under various designations as VITON A®, VITON E®, VITON E60C®, VITON E430®, VITON 910®, VITON GH® VITON GF®, VITON E45® and VITON B50®. The VITON® designation is a Trademark of E.I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS® a poly(propylene-tetrafluoroethylene) and FLUOREL II® (LII900) a poly(propylenetetrafluoroethylenevinylidenefluoride) both also available from 3M Company, as well as the TECNOFLONS® identified as FOR-60KIR®, FOR-LHF®, NM® FOR-THF®, FOR-TFS®, TH®, TN505® available from Montedison Specialty Chemical Company. In another preferred embodiment, the fluoroelastomer is one having a relatively low quantity of vinylidenefluoride, such as in VITON GF®, available from E.I. DuPont de Nemours, Inc. The VITON GF® has 35 weight percent of vinylidenefluoride, 34 weight percent of hexafluoropropylene and 29 weight percent of tetrafluoroethylene with 2 weight percent cure site monomer. The cure site monomer can be those available from DuPont such as 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known, commercially available cure site monomer.

Particularly preferred polymers for the outer layer include TEFLON®-like materials such as polytetrafluoroethylene (PTFE), fluorinated ethylenepropylene copolymer (FEP), perfluorovinylalkylether tetrafluoroethylene copolymer (PFA TEFLON®), due to their increased strength and less susceptibility to stripper finger penetration. The sheet material to be applied to the fuser member begins as Teflon powder which is mixed with a catalyst such as silicone oil, kerosene or alcohol, which is then extracted to give an extradite. The extradite is then stretched into a sheet between 2–10 mils thick. In the preferred embodiment of the invention, the extradite is stretched in two directions, such that the pores of the extradite are expanded in both directions and elongated in one direction. Extradites that perform particularly well are Tetratec 1308® (silicone catalyst) and Tetratec 2201® (kerosene catalyst).

The first step of applying the stretched polymeric sheet to the fuser member is shown in FIG. 4. At this stage fuser member 20 is comprised of substrate 4 and intermediate layer 7, fuser member 20 having journals 30 and 32 at each end. Fuser member 20 is oriented substantially perpendicular to polymeric sheet 40, journal 30 optionally passing through hole 42 or pressing against intact sheet 40 with sufficient force to hold sheet 40 firmly in place with respect to fuser member 20. The elongated pore direction of the sheet and fuser member 20 is oriented such that the elongated pore direction is substantially parallel with the longitudinal axis of fuser member 20 when the sheet is applied to the fuser member. Polymeric sheet 40 is then smoothly wrapped around fuser member from journal 30 to journal 32 such that there are no overlapping seams.

Figure 5:
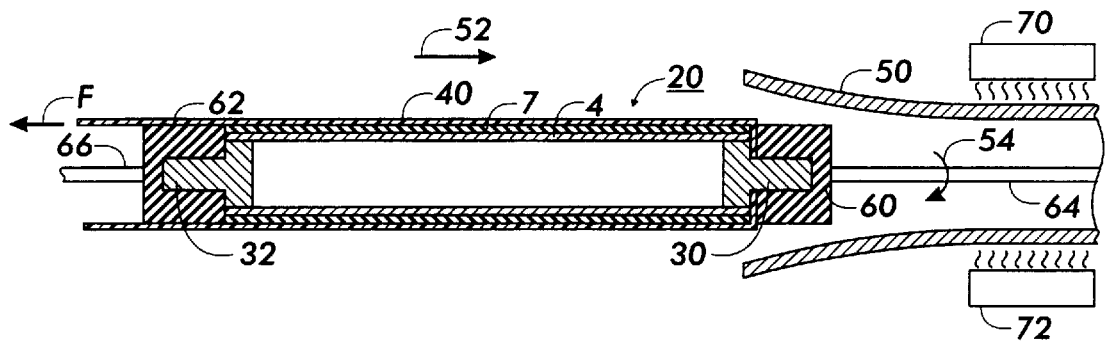
FIG. 5 shows the wrapped fuser member during the sintering process.

FIG. 5 shows the wrapped fuser member as the fuser member enters heating tube 50. Heating tube 50 may be made of any material which conducts heat and preferably is metal. After fuser member 20 is wrapped with sheet 40, the fuser member is inserted between end caps 60 and 62 which fit snugly over journals 30 and 32 at each end of fuser member 20. End cap 60 fits over journal 30 and holds sheet 40 in place as fuser member enters heating tube 50. The end caps are preferably made of rubber or plastic, however may be any other material which can withstand the sintering process without melting. End caps 60 and 62 are rotatably supported by end cap supports 64 and 66 which may be separate from or formed integrally with the endcaps, the end cap supports supporting the fuser member as it travels through heating tube 50. End cap supports 64 and 66 provide sufficient force to end caps 60 and 62 to support fuser member 20 and the end cap supports work together to move fuser member 20 through heating tube 50 in the direction shown by arrow 52. Force F may be applied to the sheet to insure that the sheet properly oriented and under tension as fuser member 20 enters heating tube 50. Polymer sheet 40 may shrink as much as 40% during the sintering process, which closes-up the previously expanded pores in the polymer sheet and results in no wrinkling. The desired pore size is between 0.5–1 microns.

In the embodiment shown, heating tube 50 has heat sources 70 and 72, which supply sufficient heat to sinter sheet 40 onto fuser member 20. The heat sources may be any type of heat source which can supply the required amount of heat to the heating tube 50 and may also be a single heat source. The exact amount of heat and time period over which the heat is applied depends upon the type of sheet material used and the degree of sintering required. The desired outcome of the sintering process is to have a fuser member with polymeric coating having a consistent degree of sintering over the entire fuser member, the coating being able to withstand the operating conditions in a fusing system and provide good toner release. An optional adhesive layer may be applied to intermediate layer 7 prior to applying sheet 40. Also, intermediate layer 7 may be ground and cleaned prior to applying sheet 40.

In addition to the heat, pressure is also applied to the fuser member to insure that sheet material 40 is smoothly applied and properly bonded to intermediate layer 7. In the embodiment shown, the pressure necessary for sintering is supplied by sizing the fuser member diameter and heating tube diameter such that when fuser member 20 travels through heating tube 50, the desired pressure is applied by the inner surface of heating tube 50 against fuser member 20. Of course, any other equivalent pressure source, such as a separate pressure applicator, associated with the heating process when a heating tube as described is not used. When the above mentioned Tetratec material is used, the temperature range is 320–450° C. for the time required to achieve the desired degree of sinter, which varies with the thickness of the polymer sheet and the pressure range is from 5–50 psi with a rotation rate of 0.5 to 1 revolution over 350 mm. In a preferred embodiment, the material is Tetratec 1308® heated to 320–370° C. with 5–20 psi pressure applied.

During the sintering process it has been found that rotating the fuser member as it travels through the heating tube results in a more even polymer coating. This rotation is accomplished by rotating end cap supports 64 and 66 which in turn cause the fuser member to rotate, as shown by arrow 54.

Figure 6:
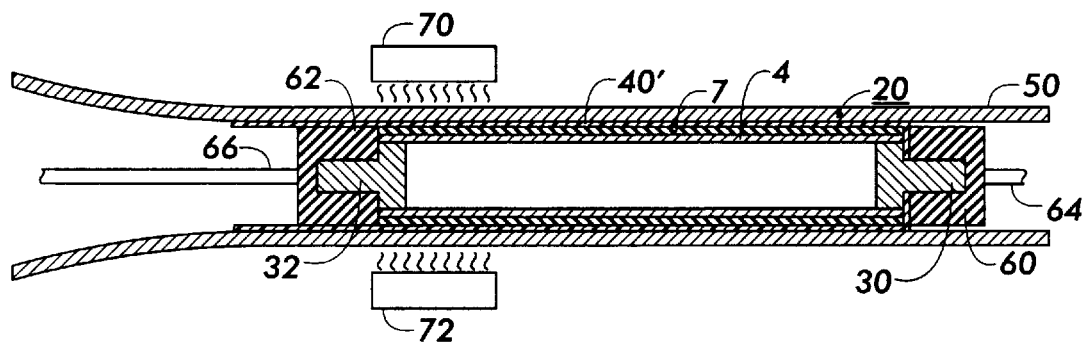
FIG. 6 shows the wrapped fuser member after the sintering process.

FIG. 6 shows the coated fuser roll just after the sintering process. It is preferred that the polymeric layer 40' be coated to a thickness of from about 2 to about 25 microns, preferably from about 5 to about 15 microns, and particularly preferred from about 7 to about 14 microns. The end caps 60 and 62 are removed from journals 30 and 32 and the ends of the fuser member are then properly sealed and trimmed by any known method such as adhesive, heat, knife, or laser treatment. The result of the sintering process is a seamless, evenly coated fuser member with no pin holes or wrinkles.

If a functional fuser oil is used in an embodiment of the invention, conductive fillers may be dispersed in the outer fusing layer of the fuser member. Preferred fillers are capable of interacting with any functional groups of the release agent to form a thermally stable film which releases the thermoplastic resin toner and prevents the toner from contacting the filler surface material itself. This bonding enables a reduction in the amount of oil needed to promote release. Further, preferred fillers promote bonding with the oil, without causing problems of scumming or gelling. In addition, it is preferred that the fillers be substantially non-reactive with the outer polymer material so that no adverse reaction occurs between the polymer material and the filler which would hinder curing or otherwise negatively affect the strength properties of the outer surface material.

However, in a preferred embodiment, there is no conductive filler present in the outer layer of the fuser member. In addition, it is preferred to use either a non-functional release agent with a TEFLON®-like material with no added conductive fillers, or alternatively, to use no fuser oil and no conductive fillers in the outer polymeric layer.

Other adjuvants and fillers may be incorporated in the layers in accordance with the present invention provided that they do not affect the integrity of the polymer material. Such fillers normally encountered in the compounding of elastomers include coloring agents, reinforcing fillers, and processing aids. Oxides such as magnesium oxide and hydroxides such as calcium hydroxide are suitable for use in curing many fluoropolymers.

The polymer layers of the present invention can be coated on the fuser member substrate by any means including normal spraying, dipping and tumble spraying techniques. A flow coating apparatus as described in U.S. application Ser. No. 08/672,493 filed Jun. 26, 1996, entitled, "Flow Coating Process for Manufacture of Polymeric Printer Roll and Belt Components," the disclosure of which is hereby incorporated herein in its entirety, can also be used to flow coat a series of fuser rolls. It is preferred that the polymers be diluted with a solvent, and particularly an environmentally friendly solvent, prior to application to the fuser substrate.

In a preferred embodiment of the invention, the surface energy of the outer polymeric layer may be reduced by adding a surfactant to the outer surface. Further, addition of a surfactant reduces pin hole defects by actually filling in or smoothing out any defects. The surfactant provides a uniform oil film which aids in uniform gloss and prevents offsetting due to microporousity.

Examples of surfactants include anionic, cationic, zwitterionic and amphoteric surfactants. Preferred are cationic surfactants such as amine compounds such as alkyl amines, and ammonium compounds such as ammonium halides. Specific examples of useful surfactants include alkyl sulfates (such as STEPANOL® SLS surfactant, a product of Stepan Company); cationics including alkyl triammonium halides (such as CTAB® surfactant, a product of VWR Scientific Inc.), polyoxyethylene cocoamine (such as MAZEEN® surfactant, a product of PPG Industries), primary alkyl amines (such as ARMEEN® surfactant, a product of Akzo Chemical Co., and others such as ADOGEN® 180-C10 ether amine, ADOGEN® 183-C13 ether amine, AROSURF® MG-70A3 isodecyl ether amine acetate, and AROSURF® MG-70A5), dicoco dimethyl ammonium halide (such as JET QUAT® surfactant, a product of Jetco Chemical Inc.), di-isodecyl dimethyl ammonium halides (such as AMMONYX® K9 surfactant, a product of Stepan Company), diaminoethyl stearate (such as CERASYNT® 303); amphoteric surfactants such as sodium cocoamphotacetate from Mcintyre Group, ADOGEN® 425–50% (a 50% aqueous solution of a trimethyl soya quaternary ammonium chloride surfactant), DERIPHAT® 154-L, a disodium N-tallow beta-iminodipropionate available from Henkel; any of the amine amphoterics from Akzo Chemicals, and anionic surfactants such as potassium sulphates, benzene sulphonates, ether sulphonates, sodium coconut oil fatty monoglyceride sulphates and sulphonates, the reaction products of fatty acids, and olefin sulphonates. Other suitable surfactants include fish oil such as KELLOX®-3-Z from Kellog Company, oleylamine from ARMEEN® O, or N-alkyl-1,3-diaminopropane dioleate, available as DUOMEEN® TDO, products of Akzo Chemie America.

A suitable surfactant can be coated on the outer polymeric layer by known methods such as embedding in the polymeric layer or adding to fuser oil, preferably 5–10 ml/liter.

Polymeric fluid release agents can be used in combination with the polymer outer layer to form a layer of fluid release agent which results in an interfacial barrier at the surface of the fuser member while leaving a non-reacted low surface energy release fluid as an outer release film. Suitable release agents include both functional and non-functional fluid release agents.

Preferred are the non-functional release agents including known polydimethyl siloxane release agents. However, functional release agents such as amino-functional, mercapto functional, hydride functional and others, can be used. Specific examples of suitable amino functional release agents include T-Type amino functional silicone release agents disclosed in U.S. Pat. No. 5,516,361; monoamino functional silicone release agents described in U.S. Pat. No. 5,531,813; and the amino functional siloxane release agents disclosed in U.S. Pat. No. 5,512,409, the disclosures each of which are incorporated herein in their entirety. Examples of mercapto functional release agents include those disclosed in U.S. Pat. Nos. 4,029,827; 4,029,827; and 5,395,725. Examples of hydride functional oils include U.S. Pat. No. 5,401,570. Other functional release agents include those described in U.S. Pat. Nos. 4,101,686; 4,146,659; and 4,185,140.

Other release agents include those described in U.S. Pat. Nos. 4,515,884; and 5,493,376. However, it is preferred to use a non-functional release agent with the present fuser configuration.

However, in a preferred embodiment, little or no fuser release agent is necessary due to the increased release and decreased surface energy provided by the fuser members disclosed herein.

The fuser members are useful in combination with many toners, including black and white toner or color toner. However, the fuser members herein are particularly useful with color toners. Color toners include those listed in U.S. Pat. Nos. 5,620,820; 5,719,002; 5,723,245, the disclosures of which are hereby incorporated by reference in their entirety.

Other layers such as adhesive layers or other suitable layers may be incorporated between the outer polymer layer and the intermediate silicone rubber layer, or between the substrate and the intermediate silicone rubber layer.

The fuser members disclosed herein are particularly useful in color duplication and printing, including digital, machines. The fuser members demonstrate excellent results at the higher temperatures such as 150–180 C necessary in color fusing. The fuser member possess smooth, conformable layers having a long-dwell nip and a decrease in swell. In addition, the normally required additional release agent is not as necessary for improving toner release due to the increase in toner used for color developing with the present fuser members. The fuser members herein provide complete toner flow, and increased gloss due to the configuration of the fuser members. Further, pinhole defects are decreased or eliminated and the surface energy is decreased by use of a surfactant.

All the patents and applications referred to herein are hereby specifically, and totally incorporated herein by reference in their entirety in the instant specification.

The following Example further defines and describes an embodiment of the present invention. Unless otherwise indicated, all parts and percentages are by weight of total solids as defined in the specification. Percentage by total volume refers to the amount per total volume of all the components in the particular layer.

EXAMPLES

Example I

A solution of silicone elastomer was prepared by mixing a silicone resin with a solvent. Aluminum oxide in an amount of about 2.5 percent by total volume of the silicone resin and copper oxide in an amount of about 35 percent by weight of total volume was added after washing and drying the particles. The solution of silicone and fillers was sprayed onto the surface of an aluminum cylinder coated with an adhesive. The thickness of the layer was determined to be about 3 mm. The elastomer materials was dried and heated to remove the solvent.

An outer layer of polytetrafluoroethylene (PTFE) was coated onto the silicone rubber layer as follows. First, The fuser member was oriented perpendicularly with respect to an expanded PTFE sheet and a first end of the fuser member was placed against the sheet. Keeping the fuser member end against the sheet, the rest of the sheet was wrapped from the first end to the second end of the fuser member so as to be continuously wrapped around the fuser member. The wrapped fuser member is then subjected to sintering which takes place in a heating tube where heat and pressure were applied. The temperature ranged from 320–435 C and the pressure ranged from 5–30 psi, preferably 340–360 C and 10–15 psi.

A surfactant ARMEEN® (a primary alkyl amine surfactant available from (Akzo Company) was coated onto the outer polymeric surface by coating the outer PTFE layer with an ARMEEN soaked rag.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

I claim:

1. A method of coating a fuser member with a polymeric sheet, comprising:

providing the fuser member, the fuser member being a fuser roll having a first end and a second end;

wrapping the polymeric sheet around the fuser member such that the sheet first comes into contact with the first end of the fuser member and is then wrapped along the length of the fuser member from the first end to the second end to form a continuous layer over the fuser member; and sintering the polymeric sheet to the fuser member to form a coated polymer layer, wherein the coated polymer layer is a seamless layer, the sintering step including:

passing the wrapped fuser member through a heating tube; and applying heat and pressure to the polymeric sheet and fuser member, wherein applying heat and pressure further comprises:

applying pressure based on the sizing of the heating tube and the fuser member such that the heating tube inner wall presses against the fuser member to supply the pressure.

* * * * *